Patented June 13, 1933

1,914,177

UNITED STATES PATENT OFFICE

GORDON R. STEUART, DECEASED, LATE OF DENVER, COLORADO, BY KATHERINE STEUART, ADMINISTRATRIX, OF DENVER, COLORADO, ASSIGNOR, BY MESNE ASSIGNMENTS, TO KALUNITE COMPANY, A CORPORATION OF DELAWARE

METHOD OF MANUFACTURING ANHYDROUS ALUMINUM SULPHATE

No Drawing. Application filed April 23, 1932. Serial No. 607,220.

This invention relates to the manufacture of a substantially anhydrous and water soluble aluminum sulphate, the object of my invention being to provide an effective and relatively economical process for the manufacture of the substantially anhydrous water soluble aluminum sulphate. Broadly speaking, this invention may be considered as a process using as a starting material a basic ammonium alum, the composition of which is approximately expressed by the following formula:

$$(NH_4)_2SO_4 \cdot 3Al_2O_3 \cdot 4SO_3 \cdot 9H_2O.$$

although, practically speaking, this invention will be most usefully applied to the treatment of ores of alumina for the preparation therefrom of normal ammonium alum and the preparation from the normal ammonium alum of the basic ammonium alum and the cyclical use of the ammonium sulphate and sulphuric acid of the normal alum and basic alum, in the treatment of further bodies of ore.

Assuming the use of a basic ammonium alum as a starting material, this invention consists in mixing with the basic alum sulphuric acid in quantity sufficient to combine with the uncombined alumina of the basic alum and, for the best results as affecting the cost of the process, the acid used should have a strength of not less than 50° Baumé. The use of a more dilute acid would involve greater furnace costs as the acid would first be concentrated by the evaporation of the excess water to approximately 50° Baumé before a complete reaction would occur. After thoroughly mixing, the paste formed by the acid and basic ammonium alum, which should be finely divided, is heated, preferably in a muffle furnace, through a range of temperatures from 200° to 600° C. This heating of the mixture will result in the reaction of the sulphuric acid with the basic alumina of the alum, to form aluminum sulphate and will also volatilize the ammonium sulphate which must be recovered. The residual product will be found to be an anhydrous water soluble aluminum sulphate.

While this process in its broader scope, can be applied to the described treatment of a basic ammonium alum produced from any raw material, its most useful application lies in its application to the treatment of aluminum ores as a starting material, with the cyclical use of the mother liquor produced in the formation of a basic ammonium alum precipitate and of the ammonium sulphate separated from the basic alum in the described step in which the mixture of basic alum and sulphuric acid is heated to form the anhydrous aluminum sulphate and volatilize the ammonium sulphate constituent of the basic alum. In this embodiment of the invention, the ore of alumina is treated, such ores for example as bauxite, kaolin, or the like, with sulphuric acid to extract its alumina constituent, as a solution of aluminum sulphate and, with many ores, it is advisable, in order to obtain a reasonably complete extraction of the alumina values, to subject the ores to a preliminary roasting to dehydrate them. Then to the aluminum sulphate solution is added a solution of ammonium sulphate, sufficient to bring the solution to the composition of a solution of a normal ammonium alum. The ammonium sulphate solution can be added to the aluminum sulphate solution at any stage of its preparation but is preferably added in admixture with the sulphuric acid used in leaching the ores. The ammonium alum solution is separated from gangue material and, for the preparation of a pure end product, must ordinarily be treated in any well known manner to eliminate soluble impurities, a process which generally involves the crystallization of the alum from the solution, the values in the mother liquor being salvaged by using the mother liquor as a part of the leach in the treatment of further bodies of ore. Where the normal alum has been crystallized from the solution, it is redissolved and, for the best results, it has been found that a solution containing 80% of alum is best adapted for the next step of the process which involves the heating of the normal alum solution under pressure to temperatures of 140° to 200° C., as a result of which a reaction takes place involving the formation and precipitation of the basic ammonium alum and a residual mother liquor containing in solution 55% of the sulphuric acid constituent of the normal alum which has been converted into a basic alum and 67% of the ammonium alum constituent of the basic alum so converted, together with such portion of the normal alum as has not been decomposed. The basic alum precipitate is then mixed with sulphuric acid and the mixture heated, as already described, to form an anhydrous aluminum sulphate and to eliminate by vaporization the ammonium sulphate of the basic alum, which is then recovered as an aqueous solution, preferably by absorbing the ammonium sulphate in the mother liquor from which the basic ammonium alum is precipitated, although the ammonium sulphate can be recovered by absorption in water, which is afterward mixed with the mother liquor. The mother liquor and the ammonium sulphate solution, with the addition of such sulphuric acid as may be necessary to raise the strength of the acid in the mother liquor to a reactive quantity and with the addition of such ammonium sulphate as may be necessary for the formation of a normal ammonium alum solution, is then used in the leaching of additional bodies of aluminum ore and the formation of the normal ammonium alum solution, to be further treated as described.

It will be seen that in the described process using an aluminum ore as a base material, the cyclical use of the sulphuric acid separated from the normal alum in the formation of the basic alum avoids the loss of a considerable quantity of sulphuric acid, while the cyclical use of the ammonium sulphate separated from the normal alum in the formation of the basic alum and separated from the basic alum during the furnace operation to which it is subjected, avoids the loss of these values and makes necessary in the treatment of further bodies of ore only the additional supply of such ammonium sulphate as may be required to make up for losses involved in the manufacturing process. Losses of ammonium sulphate are also very materially lessened by the elimination from the normal alum of 67% of its ammonium sulphate constituent during its conversion into a basic alum so that only 33% of the ammonium sulphate constituent of the normal alum remains to be eliminated from the basic alum by the described furnacing operation during which the greater part of the losses of ammonium sulphate occur.

It is also to be pointed out that the use of the basic ammonium alum in connection with a reactive quantity of sulphuric acid forms, by reason of the composition and fine division of the basic alum, a mixture which is particularly well adapted for use in the furnacing operation, which effects the reaction between the uncombined alumina and the elimination of the ammonium sulphate constituent of the mixture.

It will be noted that this process is adapted for the production of an anhydrous water soluble sulphate of alumina of any desired degree of acidity or basicity. This can be controlled by varying the quantity of sulphuric acid mixed with the basic alum and also, where the quantity of acid is, for instance, sufficient to form an acid sulphate, by continuing the heating at the higher temperatures for a sufficient time to drive off any desired proportion of the sulphuric acid radical.

The final product of this process has been referred to as water soluble. By this is meant an aluminum sulphate which is soluble within the ordinary commercial acceptance of the term. Generally, there will be a small percentage, say in the neighborhood of .2 of 1% of an insoluble material.

As an example of the carrying out of this process, it is started with a soft Georgia kaolin of the composition:

|  | Per cent |
|---|---|
| Alumina | 38.01 |
| Water | 14.27 |
| Silica | 44.65 |
| Potash | 0.17 |
| Calcium oxide | 0.04 |
| Magnesia | 0.13 |
| Ferric oxide | 1.20 |
| Titania | 1.44 |
| Phosphorous pentoxide | 0.09 |

The kaolin is disintegrated and roasted for one hour at 600° C. in a rotary kin, thereby eliminating the water content, increasing the rate of solution of the alumina in the acid, and decreasing the iron oxide solubility to 25% of the total present in the ore.

After cooling to 200° C., the calcine is treated with an acid solution containing 14% sulphuric acid and 6.3% ammonium sulphate in Pachuca tanks arranged for countercurrent flow. The reaction is complete in one hour. 90% of the alumina present in the calcine is dissolved as aluminum sulphate. Sufficient ore is used to neutralize the sulphuric acid of the leaching solution. The silica will be unattacked and negligible traces only of potash and titania dissolved. About 50% of the calcium oxide, magnesia, and phosphorous pentoxide will be found in the neutral alum solution, which will be an approximately 55% ammonium alum solution.

A solution of barium sulphide is fed into the last Pachuca tank to reduce the dissolved ferric sulphate to ferrous sulphate, in which case the alum crystallized will be iron-free.

The major portion of the insoluble residue is separated by settling in cones, which also function as washers. The finely divided insoluble residue which is not settled in the cones, is removed from the liquor by filtration through filter presses, yielding a clear alum solution.

The clear ammonium alum solution, discharged at a temperature of 80° C. from the filter presses, is cooled and crystallized in spray coolers. The crystals and mother liquor are separated by settling and filtration on a vacuum type filter, where the crystals are washed. About one-third of the mother liquor is cooled from room temperature to 0° C. by refrigeration, the alum crystals removed and the refrigerated liquor discarded. The remaining mother liquor is returned to the system and used to make up fresh batches of leach solution.

The alum crystals are dissolved by condensing steam to make an 80% solution, which is heated to 200° C. in an autoclave. 80% of the alumina will be precipitated as basic ammonium alum with the simultaneous formation of a sulphuric acid-ammonium sulphate solution. After cooling, the precipitate is separated from the liquor by settling and filtration on a vacuum filter, on which the precipitate is washed. The mother liquor is returned to the leach system to make up the fresh solvent required. The precipitate discharged from the filter contains moisture up to 30% of the dry weight.

The moist basic ammonium alum is dried to about 4% moisture content and then mixed with 0.7 parts of 63° Baumé sulphuric acid. This mixture is heated gradually from 200° C. to a final temperature of 600° C. The reaction between the acid and the basic alum proceeds rapidly at the lower temperatures forming a mixture containing some free acid and about 5% of water-insoluble matter. The treatment at the higher temperatures for one hour eliminates the ammonium sulphate constituent and reduces the amount of insoluble matter.

After cooling, the mixture will be an anhydrous aluminum sulphate with a very small percentage of insoluble matter, well within the limits of commercial specifications. Using the above proportions of acid and basic alum the final product will contain a small percentage of soluble basic alumina.

Having now described the invention, what is claimed as new and desired to secure by Letters Patent, is:

1. The method of manufacturing a substantially anhydrous water soluble aluminum sulphate which consists in mixing with precipitated basic ammonium alum, sulphuric acid in sufficient quantity to combine with the basic alumina of the basic alum to form soluble aluminum sulphate, heating the mixture to from 200° to 600° C., to cause reaction between the basic alum and the sulphuric acid and the volatilization of water and ammonium sulphate and the production of a substantially anhydrous soluble sulphate of alumina.

2. The process of manufacturing a water soluble substantially anhydrous sulphate of alumina from ores of alumina, which consists in treating an ore of alumina to extract therefrom its alumina constituent as aluminum sulphate, mixing with the so obtained aluminum sulphate, ammonium sulphate in sufficient quantity to form a solution of a neutral amonium alum, heating the ammonium alum solution under pressure to temperatures between 140° and 200° C., to effect the formation and precipitation of a finely divided basic ammonium alum and of a mother liquor consisting of a solution of sulphuric acid and ammonium sulphate, separating the basic ammonium alum from the mother liquor and mixing it with sulphuric acid in sufficient quantity to combine with the basic alumina of the basic alum to form soluble aluminum sulphate, heating the mixture to from 200° to 600° C. to cause reaction between the basic alum and the sulphuric acid, and the volatilization of water and ammonium sulphate and the production of a subtsantially anhydrous water soluble sulphate of alumina, recovering ammonium sulphate volatilized and using said ammonium sulphate together with the mother liquor from which the basic alum is precipitated in the formation of normal ammonium alum from fresh bodies of ore.

KATHERINE STEUART,
*Administratrix of the Estate of Gordon R. Steuart, Deceased.*